Figure 1:
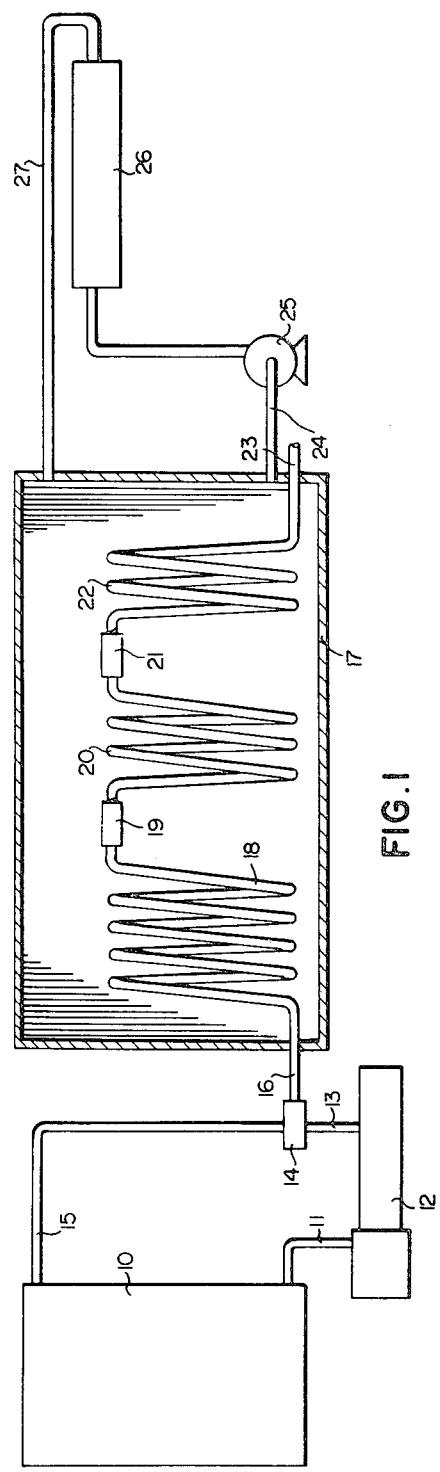

United States Patent [19]

Hughes

[11] 4,230,503
[45] Oct. 28, 1980

[54] APPARATUS FOR PRODUCING MODIFIED STARCH PRODUCTS

[75] Inventor: John F. Hughes, Montreal, Canada

[73] Assignee: Cellcor Corporation of Canada Limited, Laurent, Canada

[21] Appl. No.: 28,497

[22] Filed: Apr. 9, 1979

Related U.S. Application Data

[60] Division of Ser. No. 872,237, Jan. 25, 1978, Pat. No. 4,155,884, which is a continuation-in-part of Ser. No. 705,349, Jul. 14, 1976, abandoned, which is a continuation-in-part of Ser. No. 585,810, Jun. 10, 1975, abandoned.

[51] Int. Cl.³ .............................................. C13K 1/06
[52] U.S. Cl. ........................................ 127/1; 127/28; 127/38; 422/189; 422/193; 422/202
[58] Field of Search ................................ 127/1, 28, 38

[56] References Cited

U.S. PATENT DOCUMENTS 4,137,094   1/1979   Hughes .............................. 127/32 X Primary Examiner—Sidney Marantz

[57] ABSTRACT

A process and apparatus for producing modified starch products. A slurry of starch is continuously moved at elevated temperature and pressure through a tubular heating zone and the hot fluid mass emerging from the heating zone is forced through a flow restricting zone within which the fluid mass is highly compressed. This highly compressed fluid material emerges from the confining zone into a tubular reaction zone with a sudden release of energy in the form of a fine spray or mist. The compressive forces followed by the sudden energy release act on the starch molecules to temporarily greatly increase the reactivity of the starch within the reaction zone, whereby modified starch products are quickly formed.

9 Claims, 2 Drawing Figures

APPARATUS FOR PRODUCING MODIFIED STARCH PRODUCTS

This application is a division of Ser. No. 872,237, filed Jan. 25, 1978, U.S. Pat. No. 4,155,884 which is a continuation-in-part of Ser. No. 705,349 filed July 14, 1976, abandoned, which is a continuation-in-part of Ser. No. 585,810, filed June 10, 1975, abandoned.

BACKGROUND OF THE INVENTION

1. Field of the Invention

This invention relates to a process and apparatus for physically activating long-chain polymers, e.g. to change the conformation of starch molecules to increase their reactivity.

2. Description of the Prior Art

Starch is a high molecular-weight polymer of D-glucose units and is the principal reserve carbohydrate in plants. Most starches consist of a mixture of two types of polymers, namely, amylose and amylopectin associated by hydrogen bonding to varying degrees. Amylose is a linear polymer and may contain linear chains of several hundred glucose units linked together. In aqueous solution, the amylose chains are believed to be coiled in a helical structure. The amylopectin is a branched polymer of starch and may have a molecular size range from several hundred thousand to several millions.

Starch is, of course, one of the world's most abundant renewable raw materials, but suffers the problem of being difficult to react with most other compounds. It has long been known that major factors influencing its reactivity include the degree of intermolecular hydrogen bonding and the conformation of molecular units. More specifically, it has been known that factors which affect the reactivity of hydroxyl groups on the starch molecules are the electron density at the oxygen atom, steric interference and the presence of intra- and intermolecular hydrogen bonds associated with the particular conformation assumed by the pyranose rings.

The literature on starch chemistry is filled with proposals for increasing the activity of starch. These among other things, can involve the introduction of additional free radicals on the starch molecules which provide reaction sites. Examples of activating techniques include both chemical and mechanical techniques, such as high energy irradiation, low energy irradiation, in the presence of a synthesizing agent, redox systems and mechanical degradation.

It is also known particularly in the production of starch size solutions for use in the textile industry to make use of a mechanical shearing action in the treatment of starch. Thus, in a typical jet cooking apparatus used for producing starch sizes, starch slurry and steam under high pressure are supplied to a cooking valve. The starch slurry is metered into the cooking valve, in which the steam is allowed to impinge upon a thin film of starch. The heat gelatinizes the starch and the mechanical shearing action of the expanding steam disrupts the swollen granules. The cooked starch then is ready for the sizing operation.

Another example of shearing action on starch is to be found in Protzman et al, U.S. Pat. No. 3,137,592, dated Jund 16, 1964 where a gelatinized starch product is formed by passing a superficially dry mixture of starch and starchswelling agent through a conventional screw-type plastics extruder at elevated temperature and pressure. This has been found effective in improving the rate of reaction between raw starch material and some starch-modifying agents. However, it is concerned primarily with the production of gelatinized starch products to be used in the traditional manner.

In trying to cross-link starch polymers to produce new polymeric materials and in graft co-polymerization, traditionally one has thought in terms of non-degradative reactions in which the basic characteristic of the starch is retained. It was found that starch breaks down quite readily with heating so that starch was traditionally thought of in terms of a quite heat-sensitive material which could not be subjected to severe reaction conditions.

It is an object of the present invention to provide a process for continuously converting a liquid slurry of starch, with or without modifying agents, into a homogeneous, modified or unmodified starch solution or suspension.

It is a further object to provide an apparatus suitable for carrying out the above process.

SUMMARY OF THE INVENTION

According to this invention it has been found that starch in the form of a slurry can be highly activated by a thermal-hydraulic technique so as to modify the nature of the starch and greatly increase its reactivity with many reactants. In the method of the invention, a slurry of starch is continuously moved at elevated temperature and pressure through a tubular preheat zone and the hot fluid mass emerging from the preheat zone is forced through a primary flow restricting zone within which it is highly compressed, with the fluid material emerging from the primary restricting zone into a tubular reaction zone of reduced pressure in the form of a fine spray or mist. The release of the spray or mist of hot starch liquid into the tubular reaction zone is accompanied by a very sudden release of energy which is thought to substantially change the conformation of the starch molecules. This spray or mist is in the form of a flare which is substantially free from vortex and the hot starch liquid in this form is highly reactive.

It has been found preferable to have a second flow restricting zone downstream of the tubular reaction zone, which serves to maintain an elevated pressure within the tubular reaction zone substantially below that of the preheat zone. The outlet of the second flow restricting zone in the form of a fine spray or mist preferably enters a further tubular zone or tail zone within which the reaction can be completed.

The preheat zone can be of any desired configuration provided it is capable of maintaining a continuous flow of material. For instance, it can be a heat exchange tube through which the feed material is driven by means of a continuous flow positive displacement pump. There must be sufficient residence time within the preheat zone for the starch to pass through a gel stage followed by a reduction in viscosity before entering the primary restricting zone.

The flow restricting zone must have a cross-sectional area significantly smaller than the cross-sectional area of the tubular preheat zone and preferably has substantial length relative to its cross-sectional area. By proper selection of temperature, pressure and relative dimensions, the hot fluid mass emerges from the restricting zone into the tubular reaction zone in the form of a fine spray or mist. It is believed that the bulk of the changes in the conformation of the starch molecules take place during the release from the restricting zone into the tubular reaction zone.

It has also been found to be desirable that the outlet of the flow restricting zone be shaped such that the flare emerges in a relatively free flow with substantial freedom from vortex. Otherwise, the system may quickly become plugged at the outlet of the flow restricting zone.

The working temperature within the flow restricting zones can vary widely. Within the preheat zone it is necessary only that the temperature be raised sufficiently for the starch slurry to pass through a gel stage and form into a hot starch liquid of reduced viscosity. This free flowing starch liquid upon being forced through the restricting zone forms into the fine spray or mist. Raising the temperature of the starch in the preheat to about 100° C. will permit the above reaction to occur, but temperatures of at least 125° C. are preferred. The upper temperature limit is that at which thermal degradation of the starch will occur under the reaction conditions, e.g. in excess of 200° C. It has also been observed that there is a temperature drop across each elongated restricting zone. In a typical system using two elongated restricting zones in series, the temperature drop across the primary elongated restricting zone is usually about 10° C.–25° C. while the temperature drop across the second zone is usually only about 5° C.–10° C.

The pressure on the inlet side of the preheat zone is at least 100 psi, usually at least 250 psi, preferably 500–1000 psi. The upper limit is largely determined by the capability of the feed dump being used to pump the slurry through the system. High pressures are particularly desirable since many starch reactions are pressure responsive. Thus, a pressure of at least 200 psi is desirable in the tubular reaction zone and a pressure drop of at least 100–200 psi across the primary restricting zone is desired. A pressure drop of 300–400 psi across the primary restricting zone is particularly desirable. The pressure drop across the second restricting zone is typically in the order of 100–200 psi.

As has been stated above, it is essential that the material be continuously moved through the system but the actual rate of travel varies widely. For instance, in a typical system the slurry may travel through the preheat zone at a speed of about 2–6 feet per second and a similar speed for the material is typical in the tubular reaction zone. On the other hand, the material moves through the restricting zone at very high velocities.

As mentioned above, the pre-heat zone must have sufficient length to raise the temperature of the slurry to the desired reaction temperature and also to permit the material to pass through a gel stage. Thus typically is in the form of a heat exchange coil having a diameter of about $\frac{1}{2}$" to $2\frac{1}{2}$" and a length of from about 50 feet to several hundred feet.

The tubular reaction zone is typically in the form of a tubular coil having a diameter equal to or less than the pre-heat zone. Its length can vary greatly and must simply provide sufficient residence time for the reaction to take place. This length will usually be in the range of about 25 feet to several hundred feet.

The tubular tail zone again is typically in the form of a tubular coil and serves to receive the outlet spray or mist from the second flow restricting zone and form it into a hot flowing liquid before it is discharged from the system.

Each flow restricting zone must have a cross-sectional area less than 25% of the cross-sectional area of the immediately preceding tubular zone. Preferably each restricting zone has no single orifice with a diameter greater than about 0.25 inch. Thus, each restricting zone can consist of one or several such orifices. Particularly good results are achieved using individual orifices having diameters of less than 0.15 inch.

The length of each restricting zone can vary widely, although it has been found advantageous for the primary restricting zone to have substantial length relative to diameter. For example, the length:diameter ratio may be as little as 1:1 but a ratio of at least 2:1 is preferred, with a ratio of at least 4:1 being particularly preferred. A typical restricting zone may have a length of from less than an inch up to several inches, with a length of about 2–6 inches being particularly preferred.

It is believed that the differences in the reaction according to this invention as compared with the prior art has to do with the manner in which the hot starch liquid is forced through the restricting zone such as to discharge in the form of a flare into a tubular reaction zone. Starch in its natural state tends to have a highly curled or spiral configuration which interferes with ready access to the reactive points where reaction would normally occur. However, on passing through the elongated restricting zone at elevated temperatures and pressures, it is believed that a substantial proportion of the helical structure is removed from the starch molecules, and the structure is expanded and opened, thereby exposing more reactive points for reaction. This is supported by the fact that the traditional iodine test for the presence of starch tends to give a negative result when applied to products made according to this invention. There has been abundant evidence in the past that the strong coloration normally associated with the iodine test has been obtained by the formation of an amylose-iodine complex which is helical in character, with the iodine molecules contained inside the helical polymer. Thus, the lack of colaration in the iodine test, combined with decreases in retrogradation which indicates a decrease in hydrogen bonding or decrease in polymer-self association, together indicate a substantial change in the natural configuration of the amylose chain. It has also been observed that the product, if not stabilized with a bifunctional condensing agent, will gradually revert to its original configuration. For instance, a non-stabilized product immediately after being produced shows substantially no coloration in an iodine test, but if left for some time without further treatment, will show a strong coloration in the iodine test. On the other hand, if the product is stabilized, e.g. by condensation or cross-linking, it will show no response to the iodine test for an indefinite period of time.

The process and apparatus of the invention can be used for any of the usual starch treating processes, such as cooking, hydrolysis, etc. as well as for combining starch with a donor compound in the form of a material containing reactive components which will combine with the highly activated starch. These materials may have either monofunctional or polyfunctional reactive groups and the reaction of the particular donor compounds will be dependent upon the desired end product. The modified starch products made according to this invention have a very wide variety of commercial uses including paper manufacture and coating, textile sizing, adhesives, paint extenders, polyester-type resins, polyurethane resins, etc.

Starch Raw Material

The starch raw material adaptable to the process is any starch, waxy or non-waxy derived from root, stem or fruit of the plant. It may also consist of a conventional modified starch or derivatized starch. Typical of native starches that can be used are cereal-type, such as corn, sorghum, wheat, rice, waxy maize, waxy rice and waxy sorghum, tuber-type, such as potato, pith-type, such as sago, root-type, such as tapioca, canna, arrowroot, sweet potato and legume-type, such as pea, etc. The waxy starches, which are characterized by their high amylopectin content, appear to assist in the movement of the starch composition through the reaction zones and these waxy starches are frequently used blended with non-waxy starches. It is also possible to use within the present system as a starch source, raw food processing wastes such as potato wastes, pea processing wastes, blighted legume crops, etc. where the starch is present together with non-starch material such as protein, fat and fiber.

Feed Slurry

The slurry being fed to the system usually contains about 15–75% starch solids, although more dilute slurries can be used. For instance, in processing solid potato wastes the slurry may contain about 20 to 25% solids. The fluid carrier component of the slurry can be an inert carrier, a solvent which is non-reactive under the process conditions, or it may be a reactive agent, such as a polyhydric alcohol.

The feed slurry is normally acidic but it is also possible to use a slurry having a substantially neutral pH or a pH that is alkaline. When an acidic slurry is used, it can be acidified with an inorganic or organic acid. Typical of the inorganic acids that can be used are sulfuric acid, hydrochloric acid and phophoric acid, while typical organic acids that are suitable include citric, lactic and acetic acid. It is, of course, also possible to use acid-forming materials such as anhydrides and salts of acids which break down under heating. Normally the slurry will contain less than 5% acid and preferably less than 2% based on total weight of slurry. Inorganic and organic acids as well as acid-forming materials have been widely used in association with starches as is described in "Starch Chemistry and Technology" Academic Press Inc., New York, N.Y., 1965.

Donor Compound

For some products, all of the reactants can be mixed together and passed through the system of the invention, while for other products it is preferable to produce an intermediate modified starch product, e.g. a polyol, which is then further reacted with other modifying compounds. This further reaction can be carried out in the form of a typical batch reaction in some instances, while for other products it is preferable to pass the intermediate starch product and further reactants through the system of the invention. This can, of course, be done in a two-stage system with the further reactants being injected into the system after the first stage.

Particularly useful donor compounds for initial reaction with the starch are polyfunctional amines. By the term "polyfunctional amine", as used herein, is meant an amine or amide having at least two active amino hydrogen atoms which are on different nitrogen atoms. The polyfunctional amines contemplated include among others, the aliphatic amines, aromatic amines, aralkyl amines, aliphatic polyamines, amino-substituted aliphatic alcohols, low molecular weight polyamides, addition products of polyamines and low molecular weight epoxides containing oxirane oxygen linked to vicinal carbon atoms and others.

Illustrative amides include urea, thiourea, ethyl urea, butyl urea, dicyandiamide, melamine, ammeline, amidines, diphenyl guanidine, guanidine, oxalamide, hydrazides, phenyl biguanidine, guanylurea, and similarly acting materials, such as the diamides of the dicarboxylic acids such as oxalic, maleic, malic, succinic, etc. which contain less than about eight carbon atoms. Illustrative amines include propylene diamine, ethylene diamine, 1,3-diamino butane, diethylene triamine, triethylene tetramine, phenylene diamine, 2-chloro-N,N-diethyl-ethylamine hydrochloride and similarly reacting amines.

A particularly valuable donor compound for initial reaction with the starch is urea, which is a simple compound providing two donor sites. Urea can be used in the initial slurry with starch along with additional reactants. The urea can be effective in amounts as low as about 0.2% by weight of solids in the slurry. It is also possible to pass only starch, acid and urea through the system by themselves to form an intermediate product in the form of a starch polyol. These polyols lend themselves to further reaction with a variety of other reactants. For instance, they may be reacted with polybasic acids, yielding products of the kind used extensively in the plastic and coating field.

Among the compounds which are useful for primary or secondary reaction there may be mentioned alkylene oxides and haloepoxides. Among the alkylene oxides and haloepoxides which can be employed for this purpose are for example, various aliphatic vicinal epoxides such as ethylene oxide, 1,2-epoxypropane, 1,2-epoxybutane, 2,3-epoxybutane, 2-methyl-1,2-epoxypropane, the epoxypentanes, the epoxyhexanes, the epoxyheptanes, the epoxyoctanes, 3-chloro-1,2-epoxypropane, 3-bromo-1,3-epoxypropane, 3-chloro-1,2-epoxybutane, 3,4-dichloro-1,2-epoxybutane, 4-chloro-1,2-epoxypentane, chloroepoxyoctanes, and the like. Preferred are the alkylene oxides having from 2 to 4 carbon atoms and the aliphatic haloepoxides having from 2 to 4 carbon atoms, such as epichlorohydrin ethylene oxide, propylene oxide, the butylene oxides, 3-chloro-1,2-epoxypropane, the chloroepoxy-butanes and the like.

Polyepoxides which may be used in the preparation of the novel products of the invention include all those organic materials having at least two epoxy

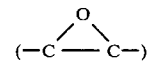

groups per molecule. The polyepoxides may be saturated or unsaturated, aliphatic, cycloaliphatic, aromatic or heterocyclic and may be substituted if desired with other substituents, such as ether radicals, and the like. They may also be monomeric or polymeric.

The monomeric-type polyepoxide compounds may be exemplified by the following: vinyl cyclohexane dioxide; butadiene dioxide; 1,4-bis(2,3-epoxypropoxy)-benzene; 1,3-bis(2,3-epoxypropoxy)benzene; 4,4'-bis(2,3-epoxypropoxy) diphenyl ether; 1,8-bis(2,3-epoxypropoxy)octane; 1,4-bis(2,3-epoxypropoxy)cyclohexane and diglycidyl ether.

Other examples of this type include the glycidyl polyethers of the dihydric phenols obtained by reacting a polyhydric phenol with a great excess of a halogen containing epoxide in the presence of an alkaline medium.

Also included within this group are the polyethers obtained by reacting, preferably in the pressence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like.

Among other possible donor compounds which are useful either for an initial reaction or secondary reaction, there can be mentioned organic acid anhydrides, such as maleic anhydride, trimellitic anhydride and fumaric anhydride; alcohols such as methanol, ethanol, n-propanol, n-hexanol, propylene glycol, diethylene, glycol, hexylene glycol and glycerol; ketones such as acetone; fatty acids of various oils such as linseed oil, soyabean oil and tung oil; silicon oils having a free hydroxyl group; vinyl esters of fatty acids such as vinyl acetate, vinyl n-butyrate; halohydrins such as ethylene chlorohydrin, propylene chlorohydrin; imines such as ethylene imine and propylene imine; acrylic compounds such as acrylonitrile, acrylamide, methacrylamide, acrolein, ethylacrylate, methylacrylate and n-butylacrylate; polyfunctional etherifying agents such as epichlorohydrin, ethylene dibromide and butadiene diepoxide.

When an intermediate modified starch product, such as a polyol, is formed by passing starth and, acid through the system of the invention, it has been found to be desirable to treat this with a condensing agent either while or after being passed through the system. The condensing agent used in this reaction may be any usual condensing agent such as, for example, formaldehyde, furfural and other aldehydes, and substances yielding aldehydes such as, for example, paraformaldehyde, etc. or any combinations of such agents. Because of low-cost, ready availability and reactivity, formaldehyde has been found to be particularly useful. Normally up to about 15% of formaldehyde is quite adequate although the presence of an excess of the formaldehyde appears to create no difficulties. Other aldehydes which can be used are glutaraldehyde, adipaldehyde, glyoxal, and the like. Polyfunctional aldehyde-generating materials such as 2-ethoxy-3,4-dihydro-2H-pyran, acrolein dimer (2-formyl-3,4-dihydro-2H-pyran), 2-alkoxy-tetrahydropyran, and the like, which generate polyfunctional aldehydes on hydrolysis, or in situ during the mixing process, can be used.

Surface Coatings

Surface coatings of the polyester (alkyl type) are normally produced by reacting a polyhydric alcohol, usually ethylene glycol with a polybasic acid, usually phthalic acid and the fatty acids of drying oils such as linseed oil, soyabean oil and tung oil. These oils are triglycerides and contain unsaturated groupings. The oil is sometimes reacted directly with the glycol to form a monoglyceride and this is then reacted with the acid to form the alkyd resin.

Utilizing the system of this invention, a starch based alkyd-type material can be produced by feeding through the system a slurry of starch, polyhydric alcohol, urea and polybasic acid. For this purpose the slurry may typically contain about equal parts by weight of starch and polyhydric alcohol, about 2-25% urea and about 1-10% polybasic acid. The total solids content of the slurry is usually about 30-75% by weight. An amber viscous liquid is obtained which can be blended in amounts up to 75% by weight with normal commercial alkyd resins in the production of paints.

The novel starch based alkyd-type material obtained is a high solids, highly viscous material which is normally diluted with water to about 65% solids for mixing with the normal alkyd. The diluted material typically has a viscosity of about 10,000 cps at room temperature.

When mixing the novel starch based alkyd-type material with normal alkyds, it is preferable to include a small amount of a coupling agent such as an isocyanate which improves the solvent acceptance of the mixed product. About 5 to 10% by weight of coupling agent is normally added and a particularly useful one has been found to be toluene diisocyanate.

Corrugative Adhesives

Starch adhesives are widely used in the manufacture of corrugated board. The principle adhesive consists of raw ungelatinized corn starch suspended in a carrier starch consisting of a gelatinized corn starch paste. Borax and sodium hydroxide are usually added to increase the adhesive strength and tack and to lower the gelatinization temperature. By varying the ratio of gelatinized to raw starch, one can obtain a desired viscosity.

With normal corrugating adhesives best results are achieved at a starch concentration of 17-22% and, in order for these adhesives to develop their adhesive properties, it is necessary to subject them to substantial drying, e.g. in a drying oven, to remove the large amount of water.

Utilizing the system of the present invention, a superior adhesive for corrugated board is produced by feeding through the system a very high solids slurry of starch, urea, mineral acid and water. A typical slurry may contain about 35-60% starch, about 2-7% urea, and about 1-2% mineral acid, with the balance water. A highly viscous liquid is obtained containing up to 75% solids and having a Brookfield viscosity at 70° C. of about 500-100,000 cps depending on reaction conditions. This product has the unique advantage of being capable of being used on existing corrugating or laminating machines and, because of its very high solids content and tack, does not require the use of drying oven for the final cure. This cold set adhesive represents a very important advantage for manufacturers of corrugated board.

Starch Polyol

The novel starch polyols obtained according to this invention are highly useful chemical intermediates which can be used as a base material for the manufacture of a variety of different products. For instance, it may be used to produce polyesters for laminating, self-curing polyester coating compositions, polyurethanes, etc.

The novel polyol is formed by preparing an aqueous slurry of starch, mineral acid and urea and passing this through the system of the invention. Only a small amount of acid, e.g. less than 2%, is used to produce an acid medium and usually about 2-25% urea is present in the slurry.

The material emerging from the system is a viscous liquid and this is treated with about 10-15% by weight of an aldehyde, such as formaldehyde. Alternatively the aldehyde is passed through the system simultaneously with the other reactants. The product can then be spray dried to form a white powder which is a water insoluble, but water sensitive material.

Laminating Polyester

The novel starch polyol can be used to make laminating polyesters. This can be done by mixing the polyol with a polyhydric alcohol, such as ethylene glycol or glycerol and a polybasic acid or anhydride, such as maleic anhydride, and passing this through the system of the invention. The product can then be combined with a curing system such as a peroxide and a cobalt compound. Typical peroxides are benzoyl peroxide, methylethylketone peroxide and cyclohexanone peroxide, while a typical cobalt accelerator is cobalt napthenate.

Self-Curing Polyester Coating Composition

The starch polyol can also be combined with drying oils, such as linseed oil, soyabean oil and tung oil and a polybasic acid such as phthalic anhydride, isophthalic acid, adipic acid or sebacic acid. This forms a self-curing coating composition.

Polyurethane Compositions

For producing polyurethanes, a different type of polyol is prepared initially. This polyol is formed by preparing a slurry of starch, polyhydric alcohol, mineral acid, urea and an unsaturated acid and passing this through the system. For greater reactivity the polyol may also include an alkylene oxide.

The polyol obtained can conveniently be mixed in a 1 to 1 ratio with an olefinic or aromatic isocyanate to produce a polyurethane-type product. The commercially most important isocyanates for this purpose are:
1. 80:20 mixtures of tolylene 2,4 di-isocyanates with tolylene 2.6-di-isocyanate (80:20 t.d.i.).
2. A 65:35 mixture of the above (65:35 t.d.i.).
3. Diphenylmethan di-isocyanates.
4. Naphthylene di-isocyanates.
5. Hexamethylene di-isocyanate.
6. Triphenylmethane-pp'p"-triyl tri-isocyanate.

The mixture normally contains a tin catalyst such as stannous octoate or dibutyl tin dilaurate and an exothermic reaction is obtained. It has been found that the degree of rigidity of the final product can vary with the amount of mineral acid contained in the polyol.

Processing Equipment

The invention also relates to a novel reactor which can be used for carrying out the above processes as well as being a general chemical reaction for a wide range of chemical reactants. The novel reactor includes an elongated tubular heating conduit adapted to move a fluid reactant therethrough under heat exchange conditions. A pump, which is preferably in the form of a continuous flow displacement pump is connected to the tubular heating conduit inlet and a primary elongated flow restricting means is connected to the tubular heating conduit outlet. This primary restricting means has a cross-sectional area not more than 25% of the cross-sectional area of the tubular heating conduit. An elongated tubular reaction conduit is flow connected to the primary restricting means outlet and a second flow restricting means having a cross-sectional area not more than 25% of the cross-sectional area of the tubular reaction conduit is flow connected to the tubular reaction conduit outlet. A further elongated tubular conduit is flow connected to the second flow restricting means outlet. These tubular conduits and flow restricting means are arranged to provide a continuous flow therethrough with the liquid emerging from each restricting means into the following tubular conduit in the form of a fine spray or mist with a sudden release of energy.

The tubular conduits are typically in the form of tubular coils. The tubular heating conduit is within some form of heat exchange system such as a heat exchange bath. The tubular reaction conduit and the further elongated conduit may also be within the same bath as the tubular heating conduit or they may be in separate baths or, in some instances, they are in no bath.

The tubular heating conduit typically has a diameter in the range of about $\frac{1}{2}''$ to $2\frac{1}{2}''$ and a length of from about 50 feet to about several hundred feet. The tubular reaction zone typically has a diameter equal to or less than the heating conduit and its length can vary greatly. However, it will usually have a length in the range of about 25 feet to several hundred feet. The further elongated tubular conduit forms a tail portion and is usually somewhat shorter than the reaction conduit.

The restricting means form an important part of the invention and it is generally advantageous particularly for the primary restricting means to have substantial length relative to its diameter. It preferably has a length: diameter ratio of at least 2:1 with a ratio of at least 40:1 being particularly preferred. As stated above, the primary restricting means has a cross-sectional area not more than 25% of the cross-sectional area of the immediately preceeding tubular zone. It has further been found preferable that each primary restricting means has no single orifice with a diameter greater than about 0.25 inch. Thus, each primary restricting means can consist of one or several such orifices and particularly good results are achieved using individual orifices at a diameter of less than about 0.15 inch. Particularly preferred restricing means also have a length of about 2–6 inches.

The configuration of the secondary flow restricting means is of less importance since its primary function is to maintain an elevated pressure within the tubular reaction conduit. Thus, both the diameter and length of this secondary flow restricting means can be varied widely.

It is, of course, to be clearly understood that all references to conduits hereinbefore can include systems with parallel banks of conduits feeding from a common inlet and discharging into a common discharge. Thus, a bank of 2 or more heating tubes can feed hot starch liquid into a single bank primary flow restricting orifice.

It is also possible to have a common hot liquid inlet into a bank of several parallel primary flow restricting orifices, with each of these orifices discharging into a separate reaction tube. Alternatively, the bank of several parallel primary flow restricting orifices may discharge into a short enlarged or bulbous portion which restricts down to a tubular conduit.

Figure 2:
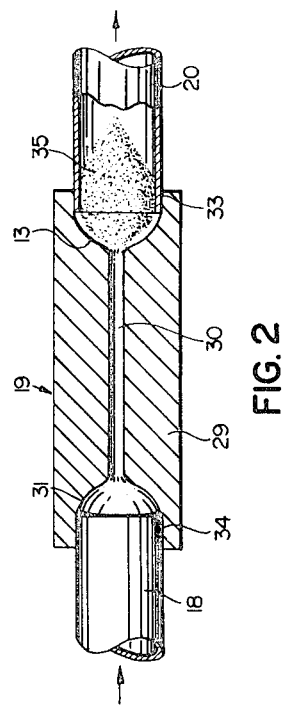

Certain preferred embodiments of the present invention are illustrated by the attached drawings in which:

FIG. 1 is a schematic flow sheet showing one embodiment of an apparatus for carrying out the invention; and FIG. 2 is a partial sectional view of one embodiment of the main reactor zone.

As will be seen from FIG. 1, a holding tank 10 is provided for a starch slurry feed. This tank has an outlet 11 which feeds into a Moyno pump 12 (available from Robbins & Myers Inc.). The slurry is pumped out of pump 12 through line 13 at high pressure and through a high pressure diverter valve 14.

The valve 14 is used to regulate the pressure in the inlet 16 to the reactor 17. This is done by bleeding off a portion of the slurry through line 15 and recycling it back into tank 10.

The main reactor 17 is a closed and insulated vessel substantially filled with a heat exchange fluid such as Therminol 66, (available from the Monsanto Company).

A stainless steel pipe is used as the reactor tube and this is made up in the form of three coiled portions 18, 20 and 22. Coil 18, which connects to inlet 16, represents the preheat zone. Coil 20 is the intermediate reaction and heating zone, while coil 22 represents a finishing zone where the reaction is completed.

Mounted between coils 18 and 20 is an orifice member 19 while a second orifice member 21 is mounted between coils 20 and 22. It is also possible to use a simplified version in which the coil 20 and orifice 21 are eliminated so that the outflow from orifice 19 goes directly to coil 22. It is also possible to use more than two orifices in sequence with an intermediate coil section similar to coil 20 being used between each pair of orifices.

Looking at an orifice member in greater detail, it can be seen that it has a main body portion 29 made from the stainless steel block with cylindrical recesses 33 and 34 for receiving the ends of tubes 20 and 18 respectively. Extending through the length of the body 29 is an orifice hole 30.

To smooth the flow of starch slurry into the orifice hole 30, there is provided an inwardly flared inlet portion 31. There is also provided an outwardly flared outlet portion 32 which has been found to also improve the flow. Thus, it has been found that if this flaring on the outlet is not provided, there is a fairly rapid build up of solid material in the vicinity of the outlet. With the flared outlet this does not occur and the slurry emerges in the form of a partially vaporized jet 35 which then transforms into a homogeneous liquid. A similar action occurs in orifice 21 with the partially vaporized jet again forming into a liquid in the coil 22 and a substantially homogeneous liquid product emerging through outlet 23. The temperature within the reaction zone is controlled by means of the heat exchange in the vessel 17. Heat is applied to the heat exchange fluid by recycling the fluid via line 24 and pump 25 through an electric heating unit 26 and back into vessel 17 via return line 27. With the heat exchange in vessel 17 being maintained at a predetermined temperature, starch slurry entering through inlet 16 at ambient temperature is heated during its passage through the preheat coil 18 to a temperature which is usually within about 20° C. of the bath temperature. The temperature of the slurry typically drops by about 10°–25° C. during its passage through the first orifice 19 and heat is received during the passage of the fluid through coil 20 so that the material passing through second orifice 21. A temperature drop also occurs during passage through orifice 21.

As has been stated hereinbefore, the dimensions of the apparatus are important, with each orifice having a cross-sectional area not greater than about 25% of the cross-sectional area of the preheat zone and have a length: diameter ratio of at least 2:1.

One apparatus which gave excellent results utilized 0.5 inch inside diameter stainless steel tubing as the reaction tube, with the preheat coil 18 having a length of 60 feet, the intermediate coil 20 having a length of 40 feet and the finishing coil 22 having a length of 20 feet. The bore of the first orifice 19 had a length of about 3.4 inches and a diameter of 0.101 inch, while the bore of the second orifice 21 had a length of about 3.4 inches and diameter of 0.093 inch.

Another successful device used a 1½" O.D. preheat coil 280 feet long and 1" O.D. reaction coil 400 feet long. The primary flow restricting zone consisted of 7 orifices 0.125" in diameter and 4" long while the secondary flow restricting zone consisted of 7 orifices 0.103" in diameter and 2⅞" long. This gave a product flow of about 8–16 U.S. gpm.

The following examples are further illustrative embodiments of this invention. All parts and proportions are by weight unless otherwise specified.

EXAMPLE 1

This example illustrates the preparation of an adhesive suitable for use in high speed application in the making of corrugated paper. The process was carried out using the apparatus described in FIGS. 1 and 2 above. That is, the coils 18, 20 and 22 were all made from ½ inch diameter stainless steel, with coil 18 having a length of 60 feet, coil 20 a length of 40 feet and coil 22 a length of 20 feet. The first orifice had a diameter of 0.101 inch and a length of 2.4 inches and the second orifice had a diameter of 0.093 inch and a length of 2.4 inches. The bath temperature was 220° C. A starch slurry was formed made from 12,000 grams corn starch, 1.000 grams urea, 9,000 grams water and 300 grams HCl. Using a gear pump, this slurry was pumped through the reactor at a reactor tube inlet pressure of 500 psi with a reaction temperature of about 150° C. in the first orifice and a reaction temperature of about 160° C. in the second orifice.

Th product is a very high solids adhesive having a viscosity of about 800 cps which has proven to be an excellent corrugating adhesive. It has the particular advantage that it does not require the use of a drying oven for final curing because of its very high solids content.

EXAMPLE 2

Using the same conditions as in Example 1, a paper coating was prepared commencing with a slurry containing 4,000 grams starch, 3,000 grams propylene glycol, 1,000 grams water, 1,000 grams urea, 10 grams $H_2SO_4$ and 250 grams maleic anhydride. The product obtained from the reactor was mixed with a quantity of Cymel 370 as cross-linking agent and proved to be an excellent heat curable coating material.

EXAMPLE 3

Again using the same operating conditions as in Example 1, a reaction was carried out starting with a slurry containing 4,000 grams waxy maize starch, 4,000 grams propylene glycol, 1,000 grams urea, 100 grams $H_2SO_4$ and 250 grams maleic anhydride.

The product obtained is a homogeneous viscous liquid which becomes substantially solid at room temperatures. The product obtained which has a very high solids content was diluted with water to about 65% solids and at this dilution had a viscosity of about 10,000 cps at room temperature.

This material was then mixed with a commercial alkyd paint base in approximately equal parts by volume together with about 5% by weight of toluene diisocyanate as a coupling agent. The product obtained met all of the requirements of a normal alkyd paint including solvent acceptance.

EXAMPLE 4

A. A slurry was prepared consisting of 1,750 grams crushed raw potato, 1,750 grams corn starch, 1,000 grams urea, 125 grams HCl and 4,000 grams water. This slurry was fed through the above reactor under the same general conditions as described above except for a bath temperature of 200° C. The product obtained was a clear gel.

B. The process of part A was repeated, this time using a slurry containing 750 grams crushed raw potato, 500 grams urea, 63 grams HCl and 4,000 grams water. Again a clear gel was obtained.

EXAMPLE 5

The purpose of this example is to illustrate the difference between the results obtained using the orifice arrangement of this invention as compared to a standard plate orifice of similar diameter. For this test a slurry is formed containing 3,500 grams starch, 175 grams urea, 125 grams HCl and 4,000 grams water.

A. Using a bath temperature of 220° C. and an inlet pressure of 500 psi, the slurry was first pumped through $\frac{1}{2}$ inch diameter stainless steel reactor tubes with a single plate orifice having a diameter of $\frac{1}{8}$ inch and a thickness of approximately $\frac{1}{8}$ inch. The slurry entered at a pH of approximately 1 and the slurry emerged also at a pH of approximately 1 with no evidence of any reaction having taken place.

B. The above procedure was repeated except with the orifices described in Example 1 above and in this case the product emerging was a homogeneous viscous fluid having a pH of about 8, and bearing no resemblance to the original slurry. This product was treated with about 10% formaldehyde and was spray dried to form a hard crystalline material. This material has been found to be an excellent base for making a variety of products.

EXAMPLE 6

Using the same equipment and operating conditions as in Example 1, another corrugating adhesive was prepared.

For this purpose a starch slurry was formed from 9,000 grams pearl corn starch, 2,000 grams waxy corn starch, 1,250 grams urea, 9,000 grams water and 500 grams HCl.

The slurry was fed in at a solids content of about 56% by weight and the product from this system had a solids content of about 70% by weight. The product was a grayish-greenish fluid having a Brookfield viscosity at 70° C. of about 600 cps. This material, which was proven to be an excellent corrugating adhesive, exhibited Newtonian properties on cooling and had a shelf life of approximately 7 days without the addition of any stabilizers.

EXAMPLE 7

Again using the same system and operating conditions as in Example 1, a starch polyol was prepared which is useful as a base material for producing a variety of plastics.

To prepare this, a slurry was first formed consisting of 11,000 grams corn starch, 9,000 grams water, 1,500 grams urea and 500 grams HCl. The product obtained from this system was a very viscous clear fluid containing about 70% solids and this was treated with about 10 to 15% formaldehyde and then spray dried to form a fine white powder.

EXAMPLE 8

A series of starch polyols were prepared utilizing the system and conditions of Example 1 and these were then mixed with an isocyanate to produce polyurethanes.

Polyol A

A slurry was prepared consisting of 4,000 grams corn starch, 4,000 grams ethylene glycol, 50 grams $H_2SO_4$, 250 grams urea and 250 grams maleic anhydride. This was fed through the reactor to form a polyol.

Polyol B

A slurry was prepared consisting of 4,000 grams corn starch, 4,000 grams ethylene glycol, 25 grams $H_2SO_4$, 250 grams urea and 250 grams maleic anhydride. This also was fed through the reactor to form a polyol.

Polyol C

Another slurry was prepared consisting of 4,000 grams corn starch, 4,000 grams ethylene glycol, 1,500 grams propylene oxide, 50 grams $H_2SO_4$, 250 grams urea and 250 grams maleic anhydride. This again was fed through the reactor to form a polyol.

Each of the above polyols was then blended in substantially equal parts by weight with an isocyanate in a batch procedure, using stannous oxylate catalyst. A very vigorous exothermic reaction was obtained and a typical polyurethane-type material was formed. The polyurethanes obtained with polyol A and polyol C were quite rigid in nature while the polyurethane obtained with polyol B show considerable flexibility.

EXAMPLE 9

This process was carried out in a somewhat simplified apparatus having a 60 foot long pre-heat coil made of $\frac{1}{2}$ diameter stainless steel and a secondary coil having a length of 40 feet between which was mounted a single orifice having an inside diameter of 0.125 inch and a length of 3.4. The bath temperature was about 220° C. and the slurry was pumped through the reactor at a tube inlet pressure of about 500 psi and a reaction temperature in the orifice of about 150° C.

A slurry was formed consisting of 4,000 grams waxy corn starch, 250 grams urea, 80 grams epichorohydrin, 1,000 grams vinyl monomer, 40 grams dibenzoyl peroxide, 2,000 grams water, 2,000 grams propylene glycol and 125 grams HCl. This was fed through the reactor under reaction conditions and the product obtained was a homogeneous, viscous material which solidified at room temperature.

EXAMPLE 10

Using the same single orifice reactor as described in Example 9 above, another reaction was carried out starting from a slurry consisting of 4,000 grams waxy corn starch, 250 grams urea, 80 grams epichlorohydrin, 1,000 grams styrene, 40 grams dibenzoyl peroxide, 2,000 grams water 2,000 grams propylene glycol and 125 grams HCl. The product obtained was a homogeneous, viscous material which solidified at room temperature.

EXAMPLE 11

Once again using the single orifice reactor of Example 9, a reaction was carried out starting from a slurry consisting of 4,000 grams waxy corn starch, 250 grams urea, 80 grams epichlorohydrin, 1,000 grams polyethylene, 40 grams dicumyl peroxide, 2,000 grams water, 2,000 grams propylene glycol and 125 grams HCl. This slurry was pumped through the reactor and the product was a homogeneous, viscous material which solidified at room temperature.

EXAMPLE 12

Again using the single orifice reactor of Example 9, a reaction was carried out starting from a slurry consisting of 4,000 grams waxy corn starch, 500 grams styrene-butadiene powder, 250 grams urea, 100 grams epichlorohydrin, 40 grams dicumyl perioxide, 2,000 grams water, 2,000 grams propylene glycol and 125 grams HCl. This slurry was pumped through the reactor under reaction conditions and a thermoplastic material was obtained which melted at 220° C.

EXAMPLE 13

Using the same system and operating conditions as in Example 1, a slurry consisting of 11,000 grams corn starch, 9,000 grams water, 1,500 grams urea and 500 grams HCl was processed. However, in this case a trace amount of tin was present as catalyst and the product obtained was a highly viscous material which precipitated into a white floc when dispersed in water.

EXAMPLE 14

This process was carried out using a double arrangement of the apparatus described in Example 1. Thus, it contained three half inch diameter stainless steel coils of the lengths of 60 ft., 40 ft., and 20 ft. respectively, having a first orifice with a diameter of 0.101 inch and a length of 3.4 inches and second orifice having a diameter of 0.093 inch and a length of 3.4 inches. However, the second orifice was followed by a third orifice having a diameter of 0.093 inch and a length of 3.4 inches followed by a coil having a length of 40 ft., then a further orifice having a diameter of 0.062 inch and a length of 2 inches and final coil having a length of 20 ft. These were all contained within a bath at a bath temperature of 200° C.

A starch slurry was formed made from 1200 grams corn starch, 9000 grams propylene glycol, 1000 maleic anhydride and 5 grams sulphuric acid as catalyst. This slurry was pumped through the reactor at a reactor tube inlet pressure of 600 psi and an outlet pressure of 12 psi with an outlet temperature of about 193° C. The slurry being fed in had a pH of approximately 0 while the product obtained had a pH of about 5 and a viscosity of about 1000–1500 cps at room temperature.

The product was a polyester which when mixed with isopropyl alcohol gave a white precipitate which, upon heating to a temperature of about 72° C., turned to liquid.

EXAMPLE 15

In this process the same procedure was followed as in Example 14 but the propylene glycol was replaced by 9000 grams of glycerol and the sulphuric acid was replaced by 5 grams of stannous oxalate.

A product very similar to that obtained in Example 14 was produced.

EXAMPLE 16

Again using the same system as that described in Example 14, a slurry was fed through made from 14000 grams corn-starch, 9000 grams linseed fatty acid, 2500 grams phthalic anhydride and 5 grams litharge. The bath temperature was 250° C. and the slurry was fed through at an inlet pressure of 800 psi and an outlet pressure of 12 psi. The slurry feed had a pH of approximately 0 while the pH of the product was about 6. The product was a yellow viscous material soluble in mineral spirits and is useful in self-curing alkyd systems.

EXAMPLE 17

This process was carried out on a two orifice system of the same general type as that described in Example 1 with the first orifice having a diameter of 0.101 inch and a length of 3.4 inches and the second orifice having a diameter of 0.093 inch and a length of 3.4 inches.

A series of feed slurries were prepared containing 12000 grams starch, 9000 grams propylene glycol, 250 grams maleic anhydride and varying amounts of sulphuric acid between 50 grams and 250 grams. The bath temperature was 200° C. and the inlet pressure ranged between 400 to 600 psi depending on the amount of acid used.

The products obtained were water-white liquids having a viscosity ranging between about 400 and 4000 cps at room temperature depending on the amount of acid used and these products had an average hydroxyl number of about 600. Moreover, the product had a maximum water content of 2%. This product is useful as a polyol for urethane reactions.

EXAMPLE 18

Using the same reactor as in Example 17, a slurry feed was fed through containing 12000 grams starch, 9000 grams propylene glycol and 250 grams sulphuric acid. The bath temperature was 200° C. and the inlet pressure was 900 psi.

The polyether product obtained had a blue colour and a viscosity of about 200 cps at room temperature. It was a urethane elastomer-material.

EXAMPLE 19

A starch slurry was formed from 100 pounds pearl corn starch, 105 pounds water and 240 mls. of hydrochloric acid (37% HCl).

Using the same reactor described in Example 17, the above slurry was pumped through at a reactor tube inlet pressure ranging from 500–900 psi and a bath temperature of 200° C. The flow rate through the reactor was about 1.3 g.p.m. The results obtained are shown in the table below.

| Bath Temp. | Inlet Press. | D.E. Value of Prod. |
| --- | --- | --- |
| 200° C. | 500 | — |
| 200° C. | 600 | 97.9 |
| 200° C. | 700 | 95.3 |
| 200° C. | 800 | 75.7 |
| 200° C. | 900 | 56.9 |

EXAMPLE 20

A sizing for paper was prepared using a simplified form of reactor having a 300 foot long pre-heat coil made of ½" diameter stainless steel on the end of which was mounted an orifice having an inside diameter of 0.125 inch and a length of 2 inches. The outlet of the orfice was connected to a short length of ½" diameter stainless steel tubing, which was directed into a collecting tank.

The bath temperature was 190° C. and a starch slurry was pumped through the reactor at a tube inlet pressure of 650 psi and a temperature at the outlet of the orifice of about 112° C.

The feed slurry contained 20.8% by weight corn starch, 220 mls of 35% HCl per 100 pounds of dry starch in the feed slurry, 0.82 mls of 33% formaldehyde per pound of dry starch in the feed slurry, 0.20% by weight of urea and 0.20% by weight of trisodium metaphosphate based on dry starch in the feed slurry.

the product obtained had the following characteristics:

Hot paste viscosity @ 8.8% solids; 24.5 cps @ 150° F.
Aged paste viscosity (24 hr) @ 8.8% solids 28.5 cps @ 150° F.
Aged paste viscosity (76 hr) @ 10% solids 52 cps @ 150° F.

A Brabender Viscoomylogram showed the product to have excellent stability and it was found to be equal to conventional hydroxyethyl starch sizings in viscosity stability and resistance to retrogradation. The film forming properties are generally superior to hydroxyethyl starch in that it adheres uniformly even to water repellant surfaces.

I claim:

1. An apparatus comprising an elongated tubular heating conduit adapted to move a fluid reactant therethrough under heat exchange conditions, a continuous flow displacement pump connected to the tubular heating conduit inlet, a primary flow restricting means connected to the tubular heating conduit outlet and having a cross-sectional area not more than 25% of the cross-sectional area of the tubular heating conduit, an elongated tubular reaction conduit flow connected to the primary restricting means outlet and a second flow restricting means connected to the tubular reaction conduit outlet, said tubular conduits and flow restricting means being arranged to provide a continuous flow therethrough with the liquid emerging from the primary restricting means into the following tubular reaction conduit in the form of a fine spray or mist with a sudden release of energy.

2. An apparatus according to claim 1 wherein the secondary flow restricting means has a cross-sectional area not more than 25% of the cross-sectional area of the tubular reaction conduit and a further conduit is flow connected to the secondary flow restricting means outlet.

3. An apparatus according to claim 1 wherein each primary flow restricting means comprises at least one flow orifice having a length:diameter ratio of at least 1:1.

4. An apparatus according to claim 1 wherein each flow restricting means has a diameter of less than about 0.15 inch.

5. An apparatus according to claim 1 wherein each restricting means outlet includes an outwardly flared portion whereby the liquid emerging from the restricting means is in the form of a substantially vortex free flare.

6. An apparatus according to claim 1 wherein said tubular conduits are in the form of coils immersed in a heat exchange bath.

7. An apparatus according to claim 1 wherein each flow restricting means has a diameter of less than about 0.25 inch.

8. An apparatus according to claim 7 wherein the primary flow restricting means comprises a plurality of flow orifices extending through a block.

9. An apparatus according to claim 7 wherein the tubular heating conduit has a diameter of at least one half inch.

* * * * *